(12) United States Patent
Elisary

(10) Patent No.: US 10,389,297 B1
(45) Date of Patent: Aug. 20, 2019

(54) TELE-MAGNETICALLY ACTIONABLE ELECTRICAL CONNECTOR AND MECHANICAL FASTENER

(71) Applicant: Kelvin D. Elisary, Oroville, CA (US)

(72) Inventor: Kelvin D. Elisary, Oroville, CA (US)

( * ) Notice: Subject to any disclaimer, the term of this patent is extended or adjusted under 35 U.S.C. 154(b) by 0 days.

(21) Appl. No.: 15/921,502

(22) Filed: Mar. 14, 2018

(51) Int. Cl.
F16B 1/00 (2006.01)
H01R 4/56 (2006.01)
H01R 4/30 (2006.01)
H02S 40/36 (2014.01)

(52) U.S. Cl.
CPC ............ H02S 40/36 (2014.12); H01R 4/305 (2013.01); H01R 4/56 (2013.01); *F16B 2001/0035* (2013.01)

(58) Field of Classification Search
CPC ......... H02S 40/30; H02S 40/36; H01R 4/305; H01R 4/308; H01R 4/32; H01R 4/34; H01R 4/36; H01R 4/363; H01R 4/366; H01R 13/6205; H01R 11/30; F16B 2001/0035; Y10T 24/32
See application file for complete search history.

(56) References Cited

U.S. PATENT DOCUMENTS

| 7,641,522 B2 * | 1/2010 | Carcangiu | H01R 4/366 439/271 |
| 9,190,198 B2 * | 11/2015 | McBroom | H01F 7/0252 |
| 2013/0333303 A1 | 12/2013 | Elisary | |

* cited by examiner

*Primary Examiner* — Vanessa Girardi
(74) *Attorney, Agent, or Firm* — Charmasson, Buchaca & Leach, LLP

(57) ABSTRACT

A mechanical and electrical connecting assembly between the surfaces of two adjacent bodies comprises, on the male part, a projecting screw driven by a magnetic motivator. A threaded cavity, on the female part, intimately engages the screw to form a rigid mechanical link between the two bodies. A washer terminal in rotative contact with the screw can accept a soldered connection with an electrical conductor. A plug terminal at the end of the cavity closes an electrical path with a conductor soldered to it. A remote outside actuator including a spinning magnet excites and causes the magnetic motivator to rotate and drive the screw either into or out of the cavity and electrical contact with the plug.

7 Claims, 3 Drawing Sheets

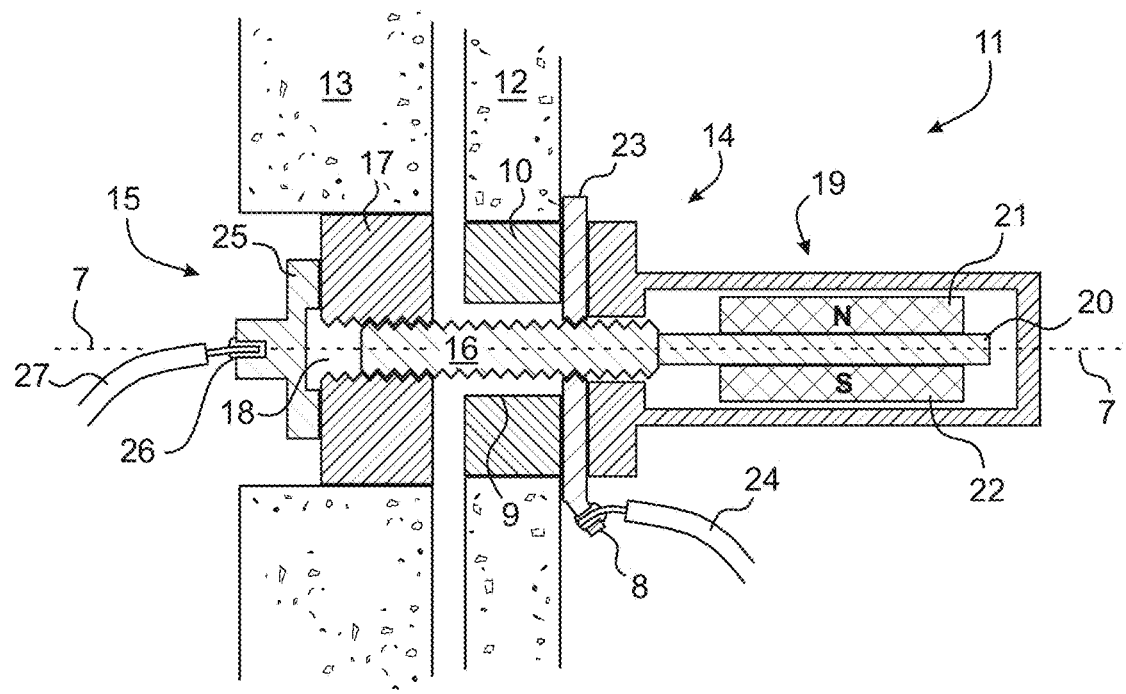
FIG. 1
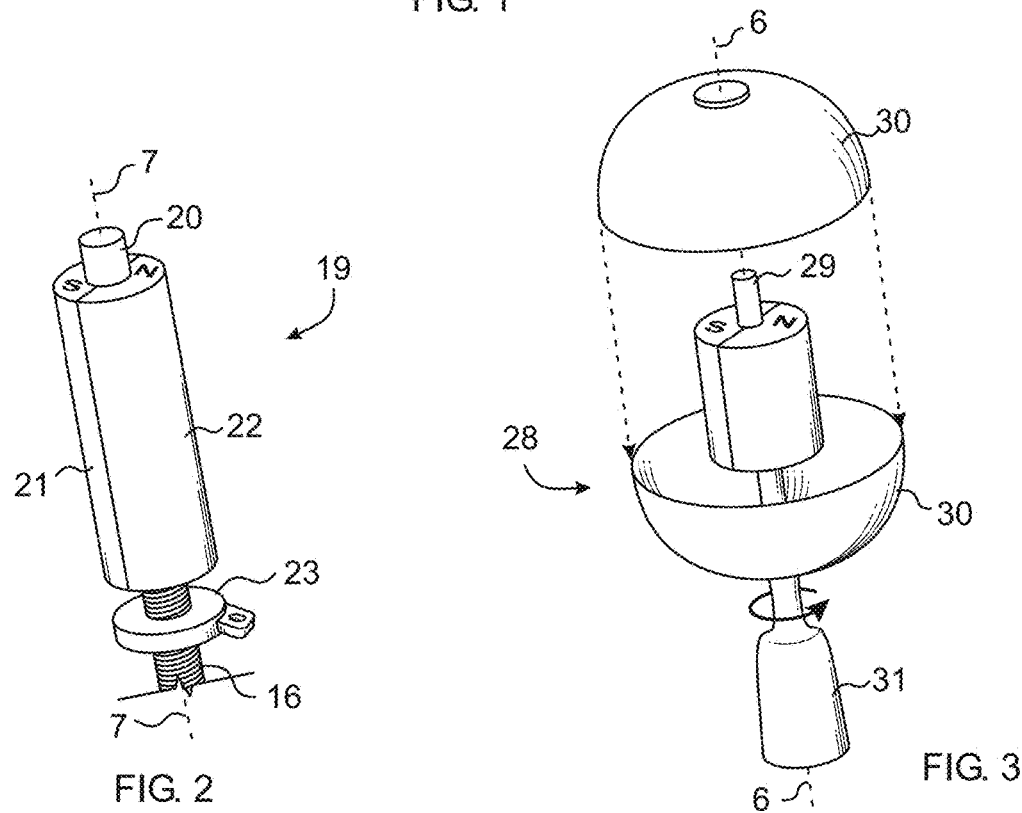
FIG. 2
FIG. 3

TELE-MAGNETICALLY ACTIONABLE ELECTRICAL CONNECTOR AND MECHANICAL FASTENER

FIELD OF THE INVENTION

This invention relates to electrical and mechanical connectors, and more specifically to connection between modular photovoltaic panels.

BACKGROUND

Modernly, many items include electronic circuitry which sends or receives signals or power by wire, rather than wirelessly. Electrically connecting and disconnecting such items can be a difficult when the connection point is located in a cramped or other difficultly accessed space. Furthermore, such connecting and disconnecting can be dangerous, again due to the location of the connection point and potentially due to the proximity of high power sources.

Photovoltaic panels used in rooftop solar energy collectors require close installation, and rapid connection and disconnection of their electrical and mechanical parts. These maneuvers are awkward and hazardous to perform on a pitched roof or other precarious location.

Another drawback of many existing electrically interconnected devices is the need to physically disconnect the device from its neighbors in order to have access to its electrical interconnecting lines. As disclosed in Elisary, U.S. Patent Publication No. 20130333303, incorporated herein by reference, many aesthetically pleasing rooftop solar energy collectors involve relatively complex physical interconnection due to the rigorous environment of the rooftop where maintaining a rugged seal against the weather elements is of primary concern. Therefore, removing a single damaged collector from an array of collectors can be especially difficult.

In the context of household electrical sockets, there are often times when the power to a particular socket needs to be shut off. In the past, this usually requires disengaging the circuit supplying that particular outlet by switching off the entire circuit at the household circuit-breaker box. Such activities can be difficult due to restricted access to the circuit box, lack of knowledge as to which of plural circuits must be switched off, and the inconvenient disabling of other electrical devices powered by the circuit being switched off Because of the dangers inherent to household level electrical power, a device which enhances safety while providing superior and reliable performance is desirable.

In addition, many households must contend with the presence of unsupervised small children. In such situations it may be desirable to de-energize certain ones of a plural number of electrical outlets on a single electrical circuit which is desired to remain energized. For example, a particularly accessible outlet in a children's playroom is often sought to be de-energized. This can often involve to use of expensive and potentially ineffective protective locking plugs or relatively permanently obscuring housings which severely reduce the ability to conveniently use the outlet.

Therefore, there is a need for an apparatus which addresses one or more of the above identified inadequacies. Specifically, for example, it would be useful for a device that could facilitate and expedite the installation or replacement of physically and electrically interconnected solar panels without complex manipulation.

SUMMARY

The principal and secondary objects of the invention are to provide a mechanical and electrical connecting assembly between two adjacent bodies. These and other objects can be achieved by a connecting or disconnecting maneuver activated by a remotely moving magnet.

In some embodiments the assembly obviates the need to use manual tools such as a wrench or screwdriver to accomplish the electrical or physical connection or disconnection.

In some embodiments the assembly can mechanically and electrically interconnect photovoltaic solar energy collecting panels.

In some embodiments there is provided a tele-magnetically actionable connector which comprises: a pair of interlocking mechanical fastening elements, each associated with one of a pair of adjacent bodies; a first of said elements having a threaded cavity; a second of said elements comprises a threaded shaft commensurately sized and threaded to engage said cavity; one of said elements being rotatable about an axis common to said cavity and shaft; and, a first magnet having at least one pair of opposite poles rotatively driving one of said elements; whereby alternate exposure of said magnet to positive and negative magnetic fields will induce a rotation of one of said elements and an axial translation of said shaft within said cavity.

In some embodiments there is provided a combination of the connector with a remote magnetic actuator, wherein said actuator comprises: a manually spinnable spindle; and, a second magnet having at least a pair of north and south poles straddling said spindle.

In some embodiments a rotational axis of said shaft and a spinning axis of said spindle are substantially parallel and separated by a distance of between about between about 1 inch (2.5 centimeter) and about 6 inches (15 centimeters).

In some embodiments said shaft is made of conductive material; and, said second element further comprises a proximal bearing made of non-conductive material engaged by said shaft, and a first metallic electrical terminal in contact with said shaft.

In some embodiments said first element comprises: a proximal, non-conductive threaded part having said cavity: and, a distal second metallic electrical terminal.

In some embodiments said second metallic electrical terminal closes said cavity.

In some embodiments opposite poles of said first magnet are straddling a rotor axially connected to said shaft.

In some embodiments said connector is mounted on facing portions of adjacent first and second bodies, wherein said first element is mounted to said first body and said second element is mounted to said second body.

In some embodiments said first element is mounted on a side of said first body and said second element is mounted on a side of said second body.

In some embodiments said bodies comprises adjacent photovoltaic panels of a solar energy collecting system.

In some embodiments there is provided a method of simultaneously electrically connecting and mechanically fastening a pair of adjacent bodies comprises: selecting an electrically conductive threaded shaft physically connected to a barrel magnet; rotatively mounting said shaft to a first one of said pair of adjacent bodies; spinning a second magnet spaced an effective distance apart from said barrel magnet; inducing said barrel magnet to cooperatively rotate in response to a changing magnetic field generated by said spinning a second magnet; translating said threaded shaft along a shaft axis into a threaded cavity mounted to a second one of said pair of adjacent bodies; and, further translating said shaft along said shaft axis until said shaft contacts an electrically conductive terminal mounted to said second one of said pair of adjacent bodies.

In some embodiments said method further comprises: orienting a spinning axis of said second magnet to be substantially parallel with said barrel magnet.

In some embodiments there is provided the combination of an electrical connector and a solar array, wherein said electrical connector comprises: a tele-magnetically actuated axially movable electrically conductive member.

The original text of the original claims is incorporated herein by reference as describing features in some embodiments.

BRIEF DESCRIPTION OF THE DRAWINGS

FIG. 1 is a diagrammatic axial cross-section of a connector according to an exemplary embodiment of the invention.

FIG. 2 is a diagrammatic perspective view of the magnetic motor.

FIG. 3 is a diagrammatic perspective, exploded view of a remote actuator according to an exemplary embodiment of the invention.

DESCRIPTION OF THE EXEMPLARY EMBODIMENTS

Figure 4:
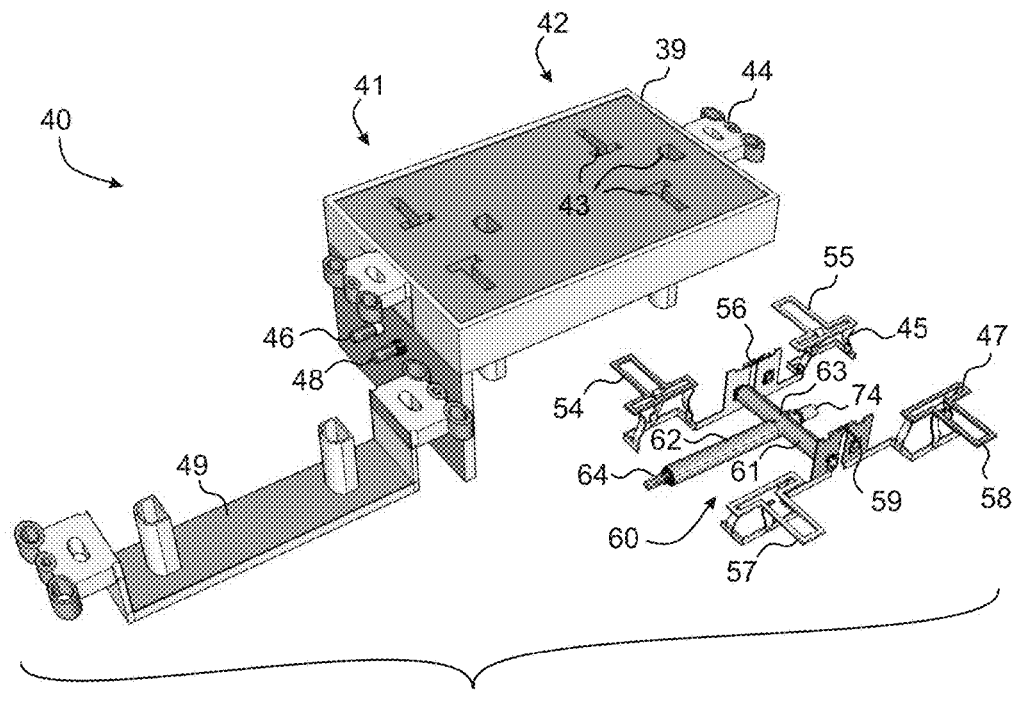
FIG. 4 is a diagrammatic perspective, exploded view of a remotely connectable household electrical outlet according to an exemplary embodiment of the invention.

Referring now to the drawing, FIG. 1 shows a connecting assembly 11 between two adjacent bodies 12 and 13. The bodies may be any mechanical or electrical devices requiring a mechanical or electrical connection between them such as adjacent photovoltaic solar panels in a solar energy collector roof system. Mounted on a side surface of the first body 12, is the male part 14 of the connecting assembly. The female part 15 is installed on the side surface of the second body 13. The male half includes a threaded shaft or screw 16 projecting perpendicularly through an aperture 9 in a non-electrically conductive bearing 10 toward and in substantial axial alignment with the female part on the adjacent body. The female part includes a non-conductive bushing 17 having a cavity 18 commensurately sized and threaded to engage the screw 16. Thus, screw and threaded cavity form cooperatively interlocking fastening elements.

The screw 16 is rotatively driven along an axis 7 by a magnetic motivator 19, illustrated in FIG. 2, comprising a rotor 20 and a cylindrical magnet having at least a pair of opposite poles 21, 22 straddling the rotor. The rotor can be rotatively fixed with respect to the screw by being welded or otherwise bonded to the screw. Alternately, the rotor and screw can be made from a single monolithic, substantially cylindrical piece of metal. A metallic washer 23 engaged over, and in contact with the screw forms an electrical terminal 8 to which may be soldered an electrical conductor 24. The washer can be attached or otherwise bonded to the bearing 10.

On the female part, a metallic plug 25 resides at and can close the distal end of the cavity 18 and forms an electrical terminal 26 to provide an electrical contact with a conductor 27 soldered to it. Accordingly, when the two bodies are interlocked by the connecting assembly, an electrical path is established between the washer terminal 8 on the first body 12 and the plug terminal 26 on the second body 13. In other words, as the screw progresses along its rotation axis 7 into the cavity, the two bodies are fastened together. Further progression of the screw into the cavity results in the electrical contact between the screw and the plug. Thus, the male and female parts form mechanical fastening elements of the connecting assembly and provide for a disableable electrical connection between the adjacent bodies as parts of an integrated connecting assembly. It shall be understood that either the male or female part of the connector may be allowed to axially translate prior to engagement of the screw 16 into the cavity 18. In this way, the connecting assembly is able to accommodate minor imprecisions in the location of the adjacent bodies due to slight manufacturing and/or installation errors.

The remote actuator 28 shown in FIG. 3 also comprises a spindle 29 which can be manually spinned about an axis 6 within a plastic, magnetically non-reactive enclosure 30 by turning a handle 31. When the actuator is manipulated within sufficient proximity of the connecting assembly 11 though still at a remote location, and with the rotation axis 7 of the motivator 19 substantially parallel with the spinning axis 6 of the remote actuator, the magnetic motivator reacts to the alternating magnetic field created by the actuator, and drives the screw 16 either clockwise or counter-clockwise and thus propels it axially into or out of contact with the cavity 18. It has been found that in the context of photovoltaic solar panels used in a household consumer-type solar energy collector roof system, the effective distance separating the remote actuator 28 spinning axis 6 and the magnetic motivator 19 rotational axis 7 can be between about 1 inch (2.5 centimeter) and about 6 inches (15 centimeters). Thus the motivator can be actuated in a tele-magnetic manner by the remotely located actuator. Those skilled in the art will appreciate the about range of distances can be adjusted by adjusting the strength of the respective magnets, with the knowledge that such an adjustment can affect the weight and bulk of the connecting assembly.

It is important to note that the above-described connecting assembly is thus capable of being obsurably mounted to the pair of adjacent bodies to improve aesthetics and to help protect the components of the assembly from environmental hazards.

FIG. 4 shows a a remotely connectable and disconnectable household electrical outlet 40 according to an exemplary embodiment of the invention. The outlet includes a pair of sockets 41,42, formed onto the outlet faceplate 39. Each socket provides three slots 43 allowing access to the electrical contacts contained within the outlet by a pronged electrical plug. The contacts include a neutral harness 45 electrically connected to the circuit neutral line 46, and a hot harness 47 for electrically connecting to the circuit hot line 48 when the outlet is energized.

The contacts also include a ground harness 44 for connecting to the circuit ground line (not shown). A second ground harness 49 is shown disassembled from the outlet to more clearly indicate its parts, namely, a pair of ground contact receptacles 50, an electrically interconnecting crossbar 51 and a pair of outlet mounts 52 located at opposite ends of the harness. In its assembled configuration, the ground harness 44 mounts to the back of the outlet faceplate 39.

The neutral harness 45 is formed by an electrically conductive framework connecting a first neutral contact 54 with a second neutral contact 55 across a conductive bridge 56. Similarly, the hot harness 47 is formed by an electrically conductive framework connecting a first hot contact 57 with a second hot contact 58 across a conductive bridge 5.

A connecting assembly 60 similar to that shown in FIG. 1 mechanically fastens the neutral harness 45 to the hot harnesses 47. In addition, the connecting assembly provides a mechanism for electrically interconnecting one of the harnesses to its respective circuit line. The assembly is most commonly configured to electrically connect to and disconnect from the hot harness 47. However, the assembly can be configured to releasably interconnect the neutral harness to the neutral circuit line.

The connecting assembly 60 includes a pair of adjacent bodies including a first body in the form of a transverse tubular member 61 having a first end attached to the neutral harness 45 and a second opposite end attached to the hot harness 47. A second body is in the form of a medial tubular member 62 having a first end abutting a medial section 63 of the transverse member and an opposite free end into which is inserted a wire 64 connected to the appropriate circuit line, in this case the hot circuit line 48. Both tubular members can be made from a rigid, durable, electrically insulating material such as a hard plastic.

Mounted on a side surface of the transverse tubular member 61, is the male part 74 of the connecting assembly. The female part 75 is installed within the medial tubular member 62. The male half includes a threaded shaft or screw 76 projecting perpendicularly through an aperture 77 in the transverse member toward and in alignment with the female part. The female part includes a non-conductive bushing 78 having a cavity 72 commensurately sized and threaded to engage the screw 76. Thus, screw and threaded cavity form cooperatively interlocking fastening elements.

The screw 76 is rotatively driven by a magnetic motivator 79, comprising a rotor 80 and a cylindrical magnet having at least a pair of opposite poles 81, 82 straddling the rotor. A metallic, electrically conductive bearing 83 engaged over, and in contact with the screw forms an electrical terminal to which may be soldered the electrically conductive hot harness 47.

On the female part, a metallic plug 85 closes the cavity 72 and forms an electrical terminal 86 to provide an electrical contact with a conductor wire 64 soldered to it by an amount of solder 87. Accordingly, when the two tubular members are interlocked by the connecting assembly, an electrical path is established between the bearing terminal 83 on the transverse tubular member 61 and the plug terminal 86 on the medial tubular member 62. The electrical path can be disabled by reversing the rotation of the shaft causing it too translate proximally away from the plug and ultimately out of the cavity.

As the screw 76 progresses along its rotation axis 88 into the cavity 72, the two bodies are fastened together. The relative axial positions of the male and female parts of the connecting assembly 60 are allowed to vary axially prior to engagement of the screw into the cavity. In this way, the connecting assembly is able to accommodate minor imprecisions in the axial location of the wire 64 within the medial tubular member due to slight manufacturing and/or installation errors.

Figure 5:
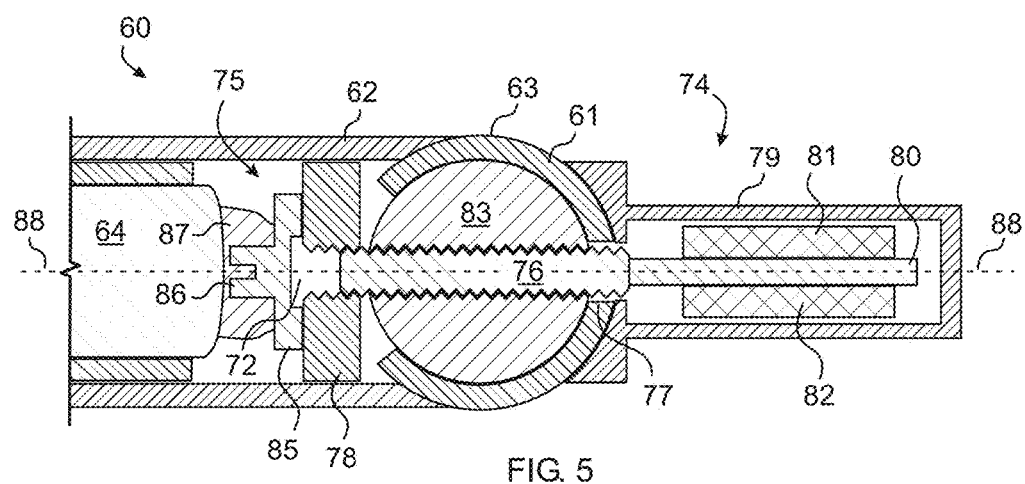
FIG. 5 is a diagrammatic partial axial cross-section of the connector of FIG. 4.

The same remote actuator 28 shown in FIG. 3 can be used to actuate the connecting assembly 60 of the embodiment of FIGS. 4 and 5. When the actuator is manipulated within sufficient proximity of the connecting assembly 60 though still at a remote location, the magnetic motivator 79 reacts to the alternating magnetic field created by the actuator, and drives the screw 76 either clockwise or counter-clockwise and thus propels it axially into or out of contact with the cavity 72 and the metallic plug 85.

It is important to note that the above-described connecting assembly is thus capable of being obsurably mounted to the pair of adjacent bodies hidden within the household outlet. In addition to improving aesthetics and to help protect the components of the assembly from environmental hazards, the components are located where contact with the electrically charged surfaces is prevented. Further, connection or disconnection can occur remotely, without the operator contacting any electrically charged surfaces.

It shall be understood that the exemplary embodiment shows the common household electrical outlet 40 having is sockets 41,42 arranged in an up-and-down, vertical orientation. However, those skilled in household electrical outlet design will readily recognize how the above described mechanisms can be adapted for other common orientations, different voltage outlets, and socket slot shapes and arrangements.

Figure 6:
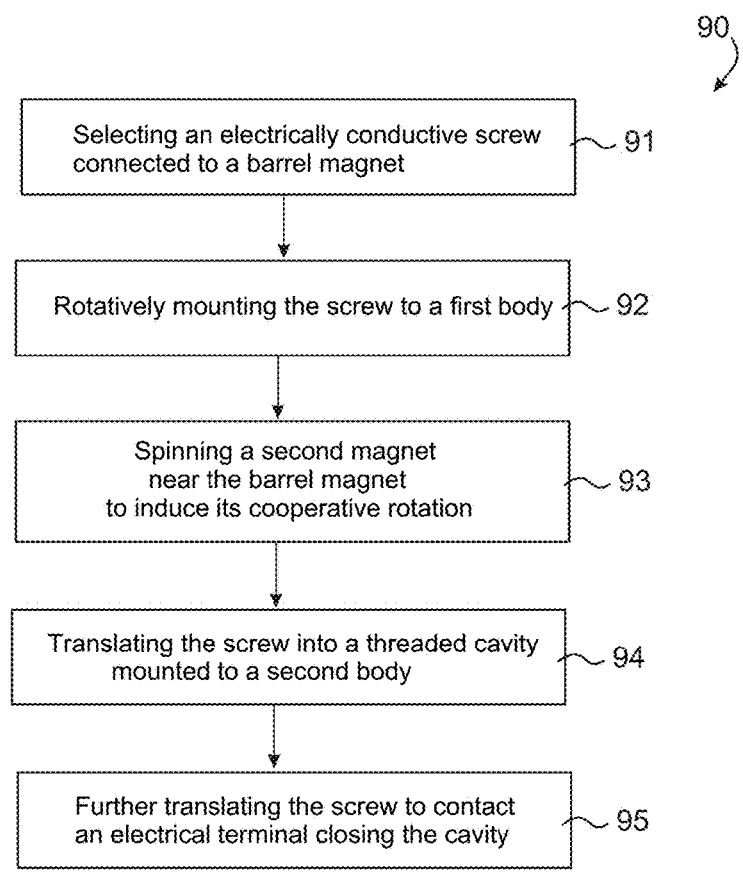
FIG. 6 is a diagrammatic flow chart diagram of the method steps for tele-magnetically actuating an integrated electrical connector and mechanical fastener.

Referring now to primarily to FIG. 6, the invention also includes a method of simultaneously energizing or de-energizing an electrical component while mechanically engaging or disengaging two adjacent bodies, all while the connector is obscurably loaded and not in physical contact with a remotely located actuator. The method 90 can include selecting an electrically conductive threaded shaft or screw physically connected to a barrel magnet 91. The screw can be rotatively and translationally mounted to one of a pair of adjacent bodies 92 so that rotation of the screw causes it to move axially. By spinning a second magnet spaced an effective distance apart from the barrel magnet, the barrel magnet is induced to cooperatively rotate in response to a changing magnetic field generated by the spinning second magnet 93. This in turn causes the rotation of the screw to translate it along its rotational axis into a threaded cavity mounted to the second of the adjacent bodies 94. By further spinning the second magnet, the screw further translates into the cavity until its distal end contacts an electrically conductive terminal mounted at the distal end of the cavity 95. The induced rotation of the barrel magnet can efficiently occur by orienting the spinning axis of the second magnet to be substantially parallel with the rotational axis of the barrel magnet and keeping the distance between the parallel axes near enough to be effective.

While the preferred embodiments of the invention have been described, modifications can be made and other embodiments may be devised without departing from the spirit of the invention and the scope of the appended claims.

What is claimed is:

1. A tele-magnetically actionable connector which comprises:
   a pair of interlocking mechanical fastening elements, each associated with one of a pair of adjacent bodies;
   a first of said elements having a threaded cavity;
   a second of said elements comprises a threaded shaft commensurately sized and threaded to engage said cavity;
   one of said elements being rotatable about an axis common to said cavity and shaft; and,
   a first magnet having at least one pair of opposite poles rotatively driving one of said elements;
   whereby alternate exposure of said magnet to positive and negative magnetic fields will induce a rotation of one of said elements and an axial translation of said shaft within said cavity;
   wherein said shaft is made of conductive material;

wherein said second element further comprises a proximal bearing made of non-conductive material engaged by said shaft, and a first metallic electrical terminal in contact with said shaft;

wherein said first element comprises a proximal, non-conductive threaded part having said cavity, and a distal second metallic electrical terminal; and, wherein said second metallic electrical terminal closes said cavity.

2. The connector of claim 1, wherein opposite poles of said first magnet are straddling a rotor axially connected to said shaft.

3. The combination of the connector of claim 1 with a remote magnetic actuator, wherein said actuator comprises:
 a manually spinnable spindle; and,
 a second magnet having at least a pair of north and south poles straddling said spindle.

4. The combination of claim 3, wherein a rotational axis of said shaft and a spinning axis of said spindle are substantially parallel and separated by a distance of between about between about 1 inch (2.5 centimeter) and about 6 inches (15 centimeters).

5. The connector of claim 1, wherein said connector is mounted on facing portions of adjacent first and second bodies, wherein said first element is mounted to said first body and said second element is mounted to said second body.

6. The connector of claim 5, wherein said first element is mounted on a side of said first body and said second element is mounted on a side of said second body.

7. The connector of claim 6, wherein said bodies comprises adjacent photovoltaic panels of a solar energy collecting system.

\* \* \* \* \*